United States Patent [19]
Kim

[11] Patent Number: 5,210,629
[45] Date of Patent: May 11, 1993

[54] METHOD OF MAKING LIQUID CRYSTAL DISPLAY ELEMENTS USING CERAMIC FILTER TO DETERMINE SPACER SIZE

[75] Inventor: Taek S. Kim, Seoul, Rep. of Korea

[73] Assignee: Goldstar Co., Ltd., Seoul, Rep. of Korea

[21] Appl. No.: 803,230

[22] Filed: Dec. 6, 1991

[30] Foreign Application Priority Data

Dec. 6, 1990 [KR] Rep. of Korea .................. 20038

[51] Int. Cl.$^5$ .................. G02F 1/1335; G02F 1/1339
[52] U.S. Cl. .................................. 359/81; 359/62
[58] Field of Search .............................. 359/81, 62

[56] References Cited

U.S. PATENT DOCUMENTS 4,740,060  4/1988  Komura et al. .................. 359/81
4,966,442  10/1990  Ono et al. ........................ 359/81

FOREIGN PATENT DOCUMENTS 0002129  1/1986  Japan .................................. 359/81

*Primary Examiner*—William L. Sikes
*Assistant Examiner*—Anita Pellman Gross
*Attorney, Agent, or Firm*—Birch, Stewart, Kolasch & Birch

[57] ABSTRACT

A ceramic filter for using in making liquid crystal display elements includes a plurality of rectangular apertures adapted to permit glass spacers having the size no more than a predetermined size to pass therethrough and a method thereof, capable of selecting easily glass spacers of a uniform size according to the use of the ceramic filter and of preventing glass spacers from lumping together by mixing them in a diluted solution and then pouring a liquid crystal orientation solution in the mixture, and of providing a uniform cell gap and a uniform ground color. It is possible to avoid entering of ionic materials by virtue of the use of ceramic filter, thereby providing a uniform cell gap.

8 Claims, 3 Drawing Sheets

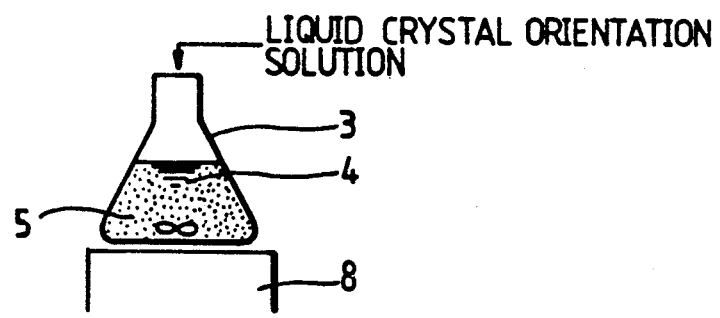
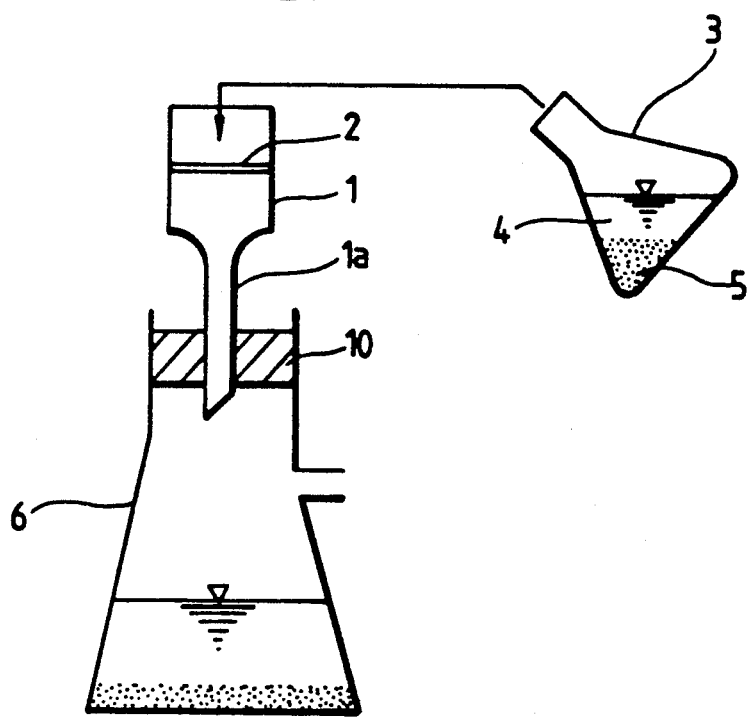

METHOD OF MAKING LIQUID CRYSTAL DISPLAY ELEMENTS USING CERAMIC FILTER TO DETERMINE SPACER SIZE

BACKGROUND OF THE INVENTION

1. Field of the Invention

The present invention relates to a method of making liquid crystal display elements and more particularly, to a method of making liquid crystal elements capable of providing a uniform gap therein by selecting glass spacers of a uniform size according to the use of a ceramic filter and mixing them in a liquid crystal orientation solution along with a dilution solvent and then printing the mixture on a glass substrate with a certain pattern.

2. Description of the Prior Art

Several types of methods of making liquid crystal display elements are well known in the art. Referring to FIGS. 1 and 2, there is illustrated a conventional method of making liquid crystal elements. In the method shown in FIGS. 1 and 2, a mixture containing a liquid crystal orientation solution is coated by a printing on a glass substrate 9 with a certain pattern indicative of characters and figures of a liquid crystal display element to be produced. That is, the mixture is first prepared by uniformly mixing the liquid crystal orientation solution with a solvent at the ratio of 1:2, and then adding bar type glass spacers (glass fibers) in the mixture. Thereafter, as the mixture containing glass spacers is coated on the glass substrate 9 with a certain pattern, a liquid crystal display element is produced.

The liquid crystal orientation solution used in making liquid crystal display elements is a polyimide solution which is a high viscous solution exhibiting a yellow brown color and having a solid content of about 3% to 15% by weight. To have a viscosity of about 200 cps to 300 cps that is proper in printing, the solution is diluted with butyl cellosolve or N.M.P. (normal methyl formamide). Thereafter, glass spacers are added in the diluted solution and mixed well therein by a magnetic stirrer to be uniformly dispersed therein. The produced mixture containing the liquid crystal orientation solution and glass spacers is then coated, by a printing, on the ITO (indium tin oxide) glass substrate 9 with a certain pattern as shown in FIG. 2.

The bar type glass spacers which are of various modules having different sizes are available commercially. The size is based on the height of diameter of glass spacers and is generally 7.0 $\mu$m, 8.0 $\mu$m, or 9.0 $\mu$m.

Such glass spacers are contained in the liquid crystal orientation solution in a predetermined amount for maintaining the gap in each cell of liquid crystal display element. Normally, they are measured in length and in height by an electromicroscope and then added in the liquid crystal orientation solution of about 500 g, in a predetermined amount of, for example, about 50 g. However, it is difficult to measure the size of glass spacers one by one by using the electromicroscope. In particular, there is a limitation in making a large liquid crystal display element requiring an accurate gap.

Furthermore, the glass spacers which are commercially available as products having the size of 9 $\mu$m may contain glass spacers having the size of 10 $\mu$m up to 10%, as shown in FIG. 3. Such glass spacers of irregular size cause the irregularity of cell gaps in the produced liquid crystal display elements. In the conventional method, since the glass spacers are directly added in the mixture containing the liquid crystal orientation solution and the solvent, the often lump together. This phenomenon of glass spacers results in the irregularity of appearing colors of liquid crystal display elements.

SUMMARY OF THE INVENTION

Accordingly, it is an object of the present invention to provide a method of making liquid crystal display elements capable of selecting easily glass spacers of a uniform size according to the use of a ceramic filter, preventing glass spacers from lumping together by mixing them in a diluted solution and then pouring a liquid crystal orientation solution in the mixture, and providing a uniform cell gap and a uniform ground color.

Another object of the present invention is to provide a method making liquid crystal display elements capable of avoiding entering of ionic materials by using a ceramic filter, thereby providing a uniform cell gap, which eliminates the above problems encountered in a conventional method of making liquid crystal display elements.

A further object of the present invention is to provide a ceramic filter for using in making liquid crystal display elements, comprising a plurality of rectangular apertures adapted to permit glass spacers having the size no more than a predetermined size to pass therethrough.

Still another object of the present invention is to provide a method of making liquid crystal display elements comprising the steps of preparing a glass spacer mixture by mixing glass spacers in a dilution solution, preparing a liquid crystal orientation solution mixture by adding a liquid crystal orientation solution in the glass spacer mixture, selecting glass spacers having a predetermined size, by passing the liquid crystal orientation solution mixture through a ceramic filter having plurality of rectangular apertures, and coating the liquid crystal orientation solution mixture containing selected glass spacers on a glass substrate.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a schematic view explaining a method of selecting glass spacers in accordance with the present invention; and FIG. 7 is a schematic view explaining a method of making a liquid crystal orientation solution mixture in accordance with the present invention.

DESCRIPTION OF THE PREFERRED EMBODIMENTS

Figure 1:
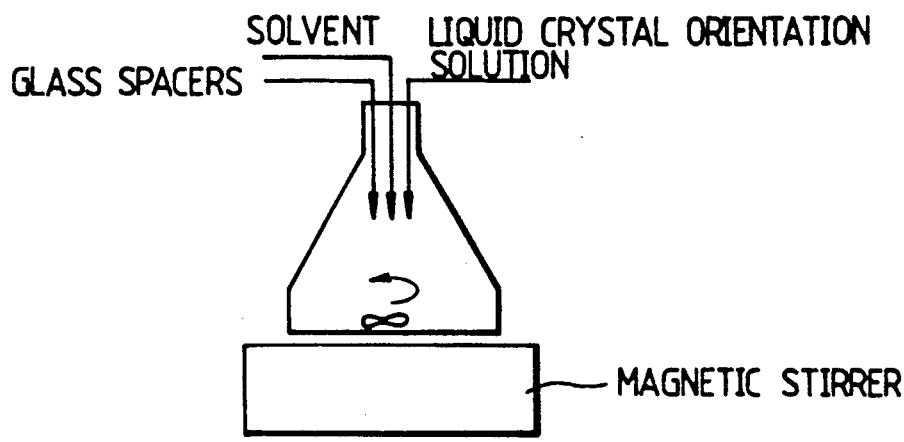
FIG. 1 is a schematic view explaining a conventional method of making a liquid crystal orientation solution.
Figure 2:
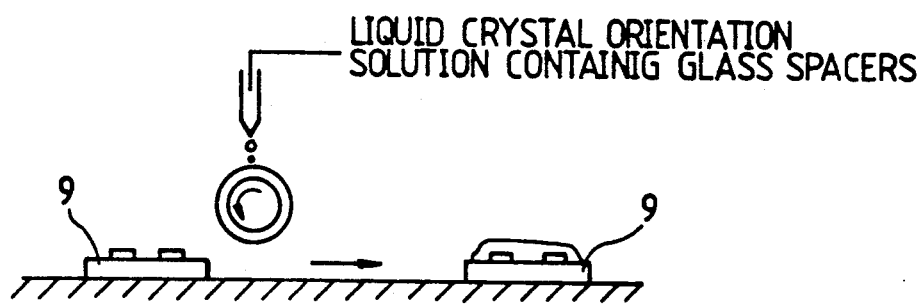
FIG. 2 is a schematic view explaining a conventional method of making liquid crystal display elements.
Figure 3:
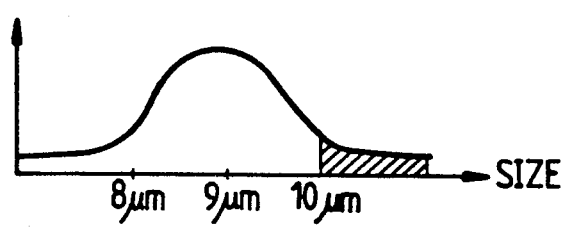
FIG. 3 is a graph illustrating the size distribution of general glass spacers.
Figure 4:
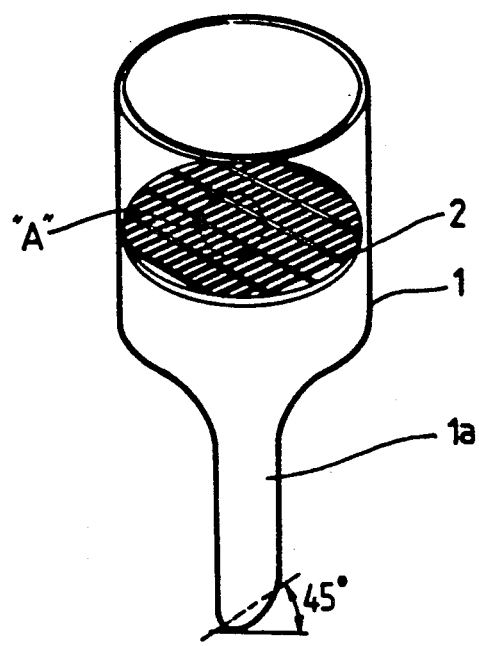
FIG. 4 is a perspective view of a glass bottle used in the present invention.

In accordance with the method of the present invention, a bottle 1 made of pyrex glass as shown in FIG. 4 is used for selecting glass spacers of a uniform size. The glass bottle 1 has an opened upper portion and a lower portion from which a supply tube 1a extends downwardly. The supply tube 1a has a lower end which is in closed state in manufacture and cut out at an angle of 45° in use.

At the middle portion of the glass bottle 1, a ceramic filter 2 which has a plurality of rectangular apertures 2a of a predetermined size is disposed in the glass bottle 1. The ceramic filter 2 divides the interior of the glass bottle 1 into upper and lower spaces. In accordance with the present invention, various ceramic filters 2 of different aperture sizes are prepared, so as to use them selectively according to the size of glass spacers to be used.

Figure 5:
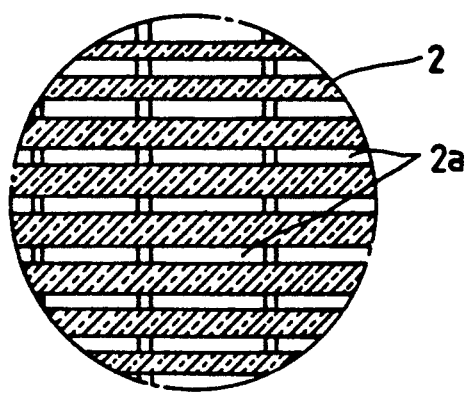
FIG. 5 is an enlarged view of the portion "A" in FIG. 4.

For example, the ceramic filter 2 may have rectangular apertures 2a having the size larger than the size in diameter of glass spacers to be used, by 0.1 μm, as shown in FIG. 5.

Most glass spacers which are commercially available are of a bar type. In case of bar type glass spacers, the size is defined by the diameter and the length thereof and is various. For example, various glass spacers having different lengths of 10 μm to 20 μm and different diameters of 7.0 μm, 8.0 μm and 9.0 μm are currently manufactured. Furthermore, the size of glass spacers cannot be always regular, even in case of being manufactured by the same manufacturer.

In this regard, the present invention is intended to select glass spacers having the size being as uniform as possible, that is, having the size that is identical to or less than the predetermined standard size, to use them in making liquid crystal display elements.

In case of selecting glass spacers of, for example, 9.0 μm, it is possible to obtain glass spacers having the size of 9.0 μm and glass spacers having the size of less than 9.0 μm, by using the ceramic filter 2 having apertures 2a of 25 μm in length and 9.1 μm in height of diameter thereof. At this time, there is no problem caused by the glass spacers having the size less than the standard size, since they have no undesirable affect on the performance of the produced liquid crystal display elements.

When a liquid crystal orientation solution mixture is to be prepared by mixing the glass spacers selected as above in a liquid crystal orientation solution, a solution 4 for diluting the liquid crystal orientation solution is first put into a vessel 3, as shown in FIG. 6. Thereafter, glass spacers 5 are put into the vessel 3 which contains the diluting solution 4, to obtain a mixture solution containing glass spacers. In the mixture solution containing glass spacers, the liquid crystal orientation solution is added, to obtain a liquid crystal orientation solution mixture. The liquid crystal orientation solution mixture is subsequently stirred for a predetermined period by using a magnetic stirrer so that glass spacers are uniformly mixed in the mixture. The mixture is then poured in the glass bottle 1 which is mounted on a flask 6 such that its supply tube 1a fits in a rubber packing 10 of the flask 6 and extends into the interior of the flask 6, as shown in FIG. 7. The poured mixture which contains glass spacers 5 passes through apertures 2a of the ceramic filter 2 disposed in the glass bottle 1 and then flows through the supply tube 1a into the flask 6.

At this time, glass spacers 5 having the size larger than the predetermined standard size cannot pass through apertures 2a of the ceramic filter 2, whereas major glass spacer parts having the size identical to the predetermined standard size and minor glass spacer parts having the size less than the predetermined standard size pass through apertures 2a of the ceramic filter 2 and then enter the flask 6.

The obtained liquid crystal orientation solution mixture has a viscosity required in printing. Also, glass spacers are uniformly dispersed in the mixture, without forming a lump. Accordingly, as the mixture is coated, by a printing, on a glass substrate with a certain pattern, a liquid crystal display element having a uniform cell gap can be produced.

As apparent from the above description, the present invention provides a method of making liquid crystal display elements, capable of selecting easily glass spacers of a uniform size according to the use of a ceramic filter and of preventing glass spacers from lumping together by mixing them in a diluted solution and then pouring a liquid crystal orientation solution in the mixture, and of providing a uniform cell gap and a uniform ground color. In accordance with the method of the present invention, it is possible to avoid entering of ionic materials by virtue of the use of ceramic filter, thereby providing a uniform cell gap.

The present invention will be understood more readily with reference to the following example; however this example is intended to illustrate the invention and is not be construed to limit the scope of the present invention.

EXAMPLE 20 g of a glass spacer mixture was prepared by mixing 10 g of glass spacers (9.0 μm) which was commercially available in 100 g of a dilution solution. In the prepared glass spacer mixture, 55 g of a liquid crystal orientation solution was added, so as to obtain 165 g of a liquid crystal orientation solution mixture. The liquid crystal orientation solution mixture was subsequently stirred for a proper period by using a magnetic stirrer, thereby causing glass spacers to be uniformly mixed in the mixture. Thereafter, the mixture (165 g) was subjected to a filtering process using a ceramic filter provided with a plurality of apertures having the size of 9.1 μm, so as to select glass spacers having a uniform size. The liquid crystal orientation solution mixture containing glass spacers having a uniform size was then coated, by a printing, on a glass substrate with a certain pattern. The produced liquid crystal display element had a uniform cell gap.

In this example, the used dilution solution was butyl cellosolve or normal butyl formamide. The liquid crystal orientation solution was polyimide.

The invention being thus described it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A ceramic filter for using in making liquid crystal display elements comprising:

a plurality of rectangular apertures adapted to permit glass spacers having the size no more than a predetermined size to pass therethrough.

2. A method of making liquid crystal display elements comprising the steps of:

preparing a glass spacer mixture by mixing glass spacers in a dilution solution, preparing a liquid crystal orientation solution mixture by adding a liquid crystal orientation solution in said glass spacer mixture, selecting glass spacers having a predetermined size by passing the liquid crystal orientation solution mixture through a ceramic filter having a plurality of rectangular apertures, and coating the liquid crystal orientation solution mixture containing selected glass spacers on a glass substrate.

3. The method of claim 2, wherein the step of preparing said glass spacer mixture is achieved by using a magnetic stirrer.

4. The method of claim 2, wherein a mixing ratio of said glass spacers to said dilution solution is 1:10.

5. The method of claim 2, wherein a mixing ratio of said glass spacer mixture to said liquid crystal orientation solution mixture is 2:1.

6. The method of claim 2, wherein said dilution solution is butyl cellosolve or normal butyl formamide.

7. The method of claim 2, wherein said liquid crystal orientation solution is polyimide.

8. The method of claim 2, wherein said liquid crystal orientation solution has a viscosity of 200 cps to 300 cps.

* * * * *